Dec. 13, 1955 M. MARTELLOTTI 2,726,579
BAR STOCK MACHINING DEVICE
Filed Oct. 6, 1950 3 Sheets-Sheet 1

INVENTOR.
MARIO MARTELLOTTI
BY
H. K. Parsons & L. W. Wright
ATTORNEYS

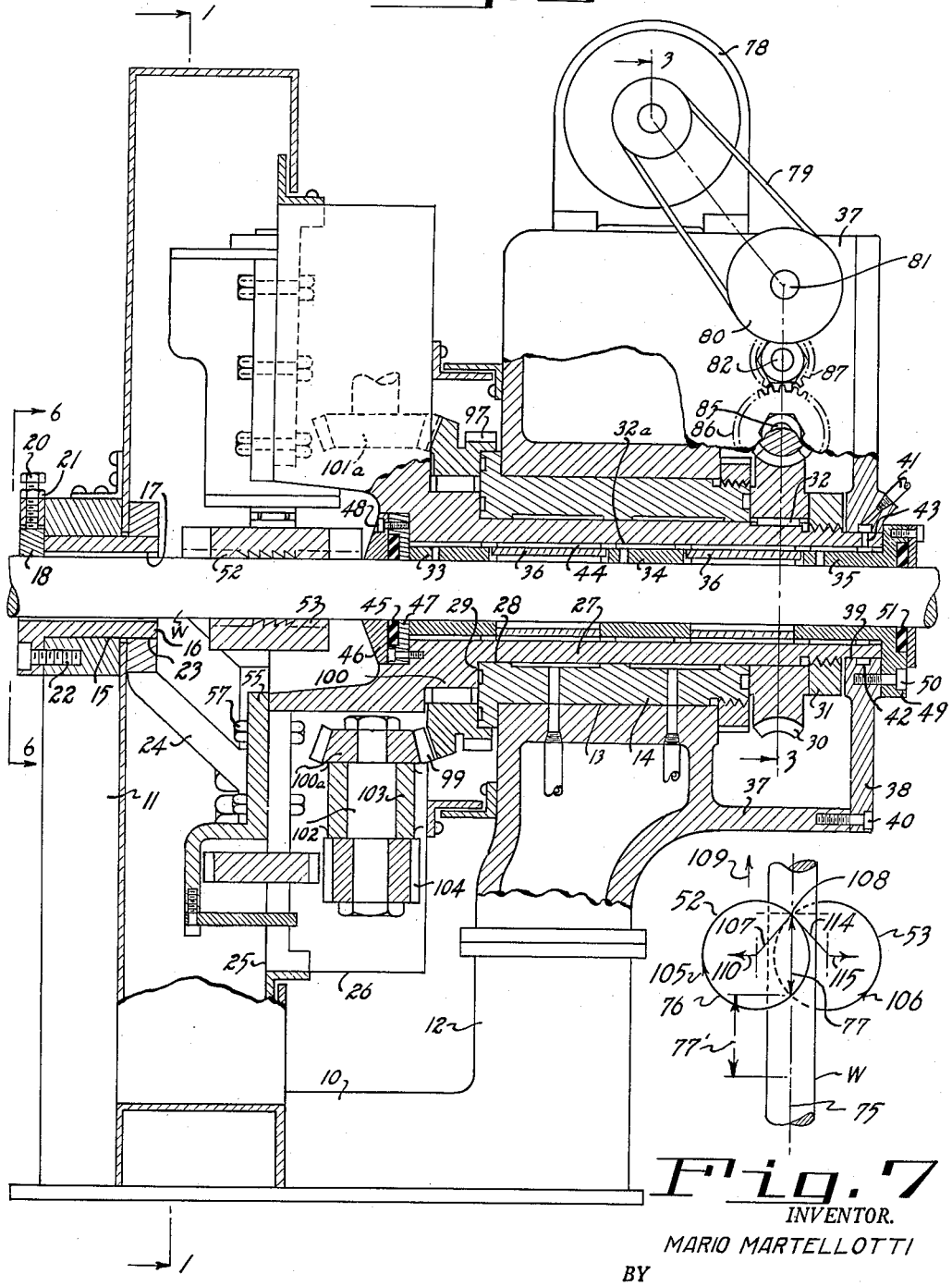

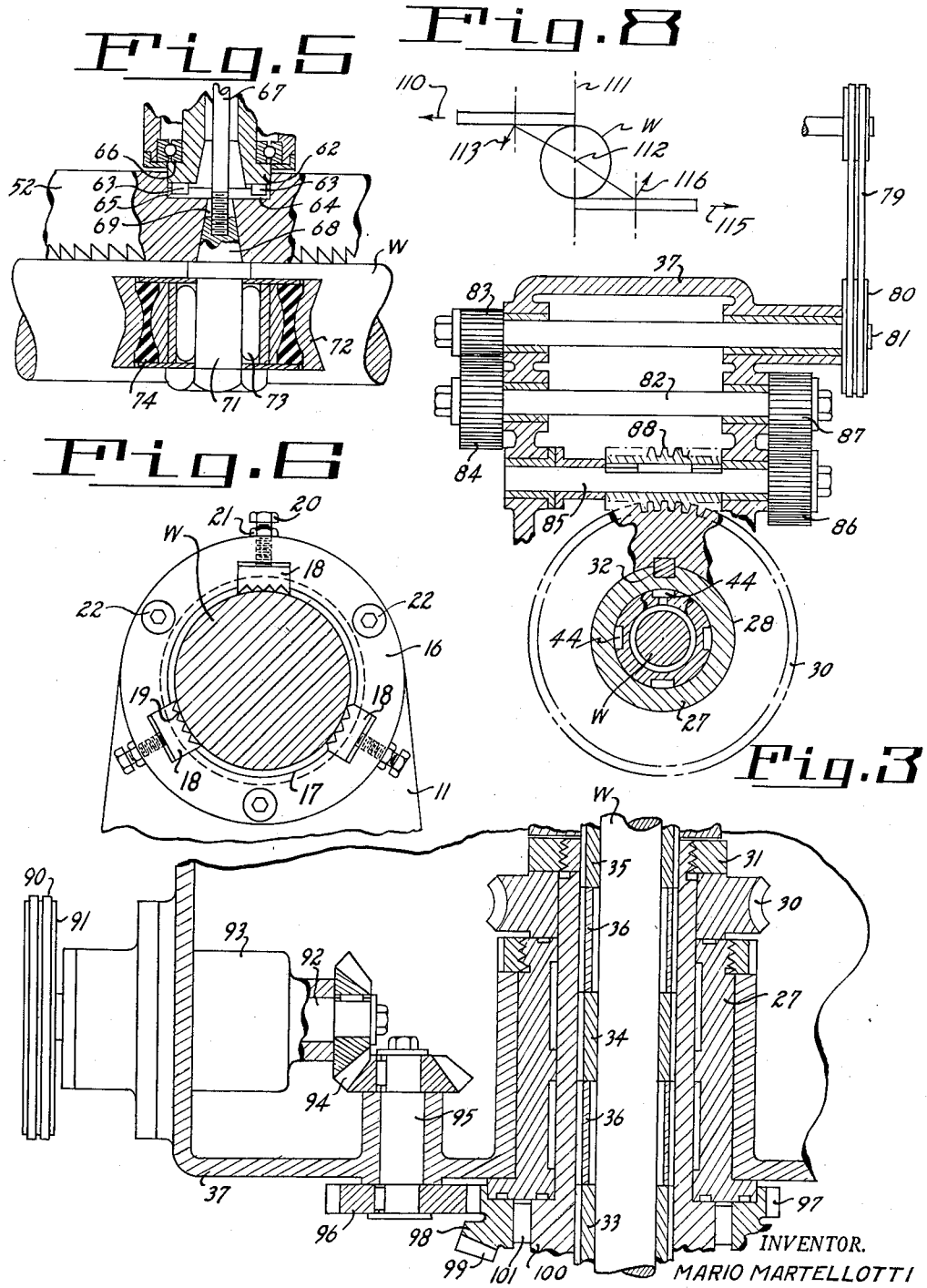

United States Patent Office 2,726,579
Patented Dec. 13, 1955

2,726,579

BAR STOCK MACHINING DEVICE

Mario Martellotti, Cincinnati, Ohio, assignor, by mesne assignments, to La Salle Steel Company, Chicago, Ill., a corporation of Delaware Application October 6, 1950, Serial No. 188,681

2 Claims. (Cl. 90—15)

This invention relates to the machining of long bar stock and the like in which unfinished bars as produced in the rolling mill are continuously fed through a machine relative to cutting tools for the purpose of reducing the bars to a predetermined size and finish.

More particularly, this invention is directed to improving the cutting mechanism utilized in such operations so as to effect stock removal at a faster rate than is now attainable and thus make possible higher feeds and the saving of time per work piece.

Another object of this invention is to provide an improved mechanism for driving the cutting tools which is economical in the use of power, thus making possible a lighter and more inexpensive driving mechanism.

A further object of this invention is to provide an improved cutter head unit for incorporation in long bar turning machines which is self-contained but readily utilizable with the power feeding mechanisms of such machines.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Referring to the drawings in which like reference numerals indicate like or similar parts:

Figure 2 is a side elevation partly in section as viewed on the line 2—2 of Figure 1.

Figure 3 is a section through a portion of the driving mechanism as viewed on the line 3—3 of Figure 2.

Figure 4 is a section on the line 4—4 of Figure 1.

Figure 5 is an enlarged view through a portion of the tool spindle as viewed on the line 5—5 of Figure 1.

Figure 6 is a detail view on the line 6—6 of Figure 2.

Figure 7 is a diagrammatic view showing the relative directions of movements of the cutting elements.

Figure 8 shows a force diagram involving the work and cutters.

Figure 1:
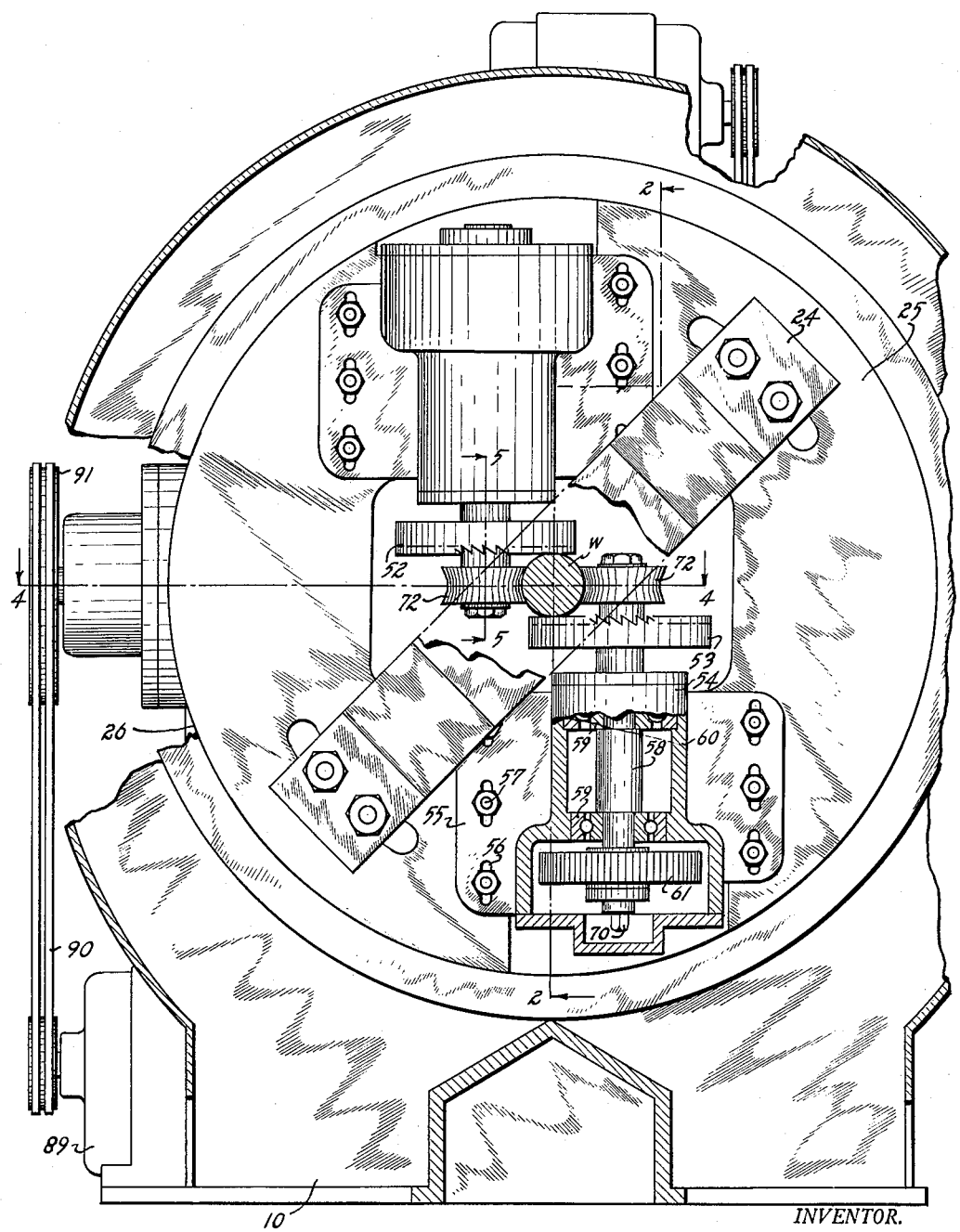
Figure 1 is an end elevation partly in section of the machining unit constituting this invention as viewed on the line 1—1 of Figure 2.

In the art to which this invention pertains, long bar stock is moved continuously through a turning machine by means of power driven pressure friction rollers or the like which apply a feed component to the work which thereby moves the stock through a cutting unit for the purpose of removing the excess stock from the periphery of the work in the form of chips to reduce the bar to a predetermined size and finish. In such machines the bar stock is not rotated, and therefore the cutting tools are arranged to rotate or move bodily around the work during its progress, thereby removing chips at some uniform rate.

This invention contemplates an improved cutting unit for use in such machines, and it is to be understood that any of the known forms of feeding means may be utilized therewith to apply the necessary feed component to the work whereby the specific nature of the feeding means forms no part of the present invention. Although these machines are known as bar turning machines, in this invention the cutting tools are actually milling cutters with the result that the stock is removed by a milling operation rather than the conventionally known turning operation, and it will be explained how certain advantages flow from this arrangement.

Referring to Figures 1 and 2, the reference letter W indicates a portion of a piece of a hot rolled bar stock which is to be processed by removing the scale and sufficient additional material from its periphery to produce a predetermined accurate size as well as a satisfactory surface finish. The reference numeral 10 indicates the bed from which uprises a first pedestal 11 which forms an outboard support for receiving and supporting the end of the work piece W when it is first introduced into the device.

A second pedestal 12 uprises from the base 10 and is provided with a bore 13 in which is mounted a bushing 14 which forms the main bearing for the rotatable cutter head.

It will be noted that the work piece W passes through the axis of the bearing 14 from left to right, and it is to be understood that suitable power driven work feeding means are provided for feeding the work through the device and located on opposite sides of the device as viewed in Figure 2. Since such feeding means, usually in the form of power driven friction rollers, are well known in the art, and since they form no part of the present invention, they are not illustrated herein. Usually, the work feeding means only imparts an axial component to the work, and therefore, the work piece is not rotated. However, since the cutting action produced by this device would tend to impart rotation to the work piece, positive means have been provided for preventing rotation of the work while still permitting axial movement thereof.

This means is mounted or supported on the pedestal 11 in which is formed a bore 15. A bushing 16 is inserted in the bore 15, and is interchangeable with other bushings to provide a bushing with a hole 17 which is in accordance with the size of the work piece being processed. The bore 17 is slightly larger than the work piece to provide a limited sliding clearance, the work being centered in the bore by three adjustable jaws 18, shown in Figure 6, which has pointed teeth, as 19, extending longitudinally of the work piece so that they will permit longitudinal movement of the work piece but prevent rotation thereof. Each jaw is adjusted and secured in position by adjusting screws 20 and lock nuts 21. The jaws are adjusted so that they will dig in slightly into the scale on the work piece but not sufficiently deep as to leave any marks after the work has been reduced to its finished size. The bushings are secured to the pedestal by suitable countersunk screws 22.

It is to be noted that the bushing 16, as it is placed in position, is also inserted into a bore 23 of an outboard bracket 24 which is bolted to the face 25 of a rotatable cutter head 26. The cutter head has an integral journal portion 27 which is rotatably mounted in the bore 28 of the bushing 14. The cutter carrier is of considerable weight and overhangs the bearing 28, and although the bearing surface 28 is made of reasonable length, it has been found that a steadier cutting action can be obtained by providing the outboard support 24 for rotation with the head but journaled on the end of the bushing 16.

The journal 27 of the cutter carrier is held against longitudinal movement in its bushing by a shoulder 29 formed at one end, and a worm gear 30 mounted on the other end and held in position by a nut 31. The worm gear 30 is keyed at 32 for the purpose of imparting rotation to the cutter carrier.

The journal portion 27 is provided with a bore 32a for passage of the work, and this bore is fitted with spaced bushings, such as 33, 34, and 35 which are held apart by space 36. The bushings 33, 34, and 35 are interchangeable to provide a bore dependent upon the size of the work piece to form a support therefor but with sufficient clearance to permit passage of the work therethrough without excessive friction. Means are provided for lubricating these bushings in the following manner. The housing 37, which is part of the pedestal 12, and contains the worm gear and part of the drive mechanism therefor and is provided with a cover plate 38 which has a bore 39 that receives the reduced end of the journal 28. This cover plate is secured in position by suitable means, such as the screws 40. The cover plate is provided with a lubricant connection 41 which communicates with an annular groove 42 formed in the bore 39 of the cover plate. The journal 28 has one or more radial holes 43 interconnecting the annular groove 42 to an axial passage or groove 44 extending continuously through the several bushings and spacers. Each bushing and spacer is provided with one or more radial holes for lubricating the bores of the several devices to facilitate passage of work therethrough.

To prevent loss of lubricant, one end of the bore 32a is provided with a gasket 45 forming a tight fit on the work and held in position between two plates 46 and 47, which are secured together and to the rotatable head by screws 48. The other end of the bore is sealed by the bushing 35 which has an enlarged flange 49 that is secured to the cover plate 38 by screws 50. It is to be noted that the flange 49 is secured to a fixed part of the device such as the cover plate 38 so that it does not rotate with the journal member of the cutter head. In addition, all of the bushings and spaces have interlocking teeth and notches on their end faces whereby they are all held against rotation by the bushing 35. An additional gasket 51 may be provided in connection with bushing 35 to prevent excessive loss of lubricant from this end of the bearing.

The machining operation is performed by a pair of milling cutters 52 and 53 shown in Figure 1. Each cutter is carried by its own spindle carrier which are similar in construction and therefore description of one will suffice for both. For instance, the spindle carrier 54 for the cutter 53 has a base plate or flange portion 55 in which are formed a plurality of slots 56, six slots being shown, for receiving clamping bolts 57 which secure the spindle carrier to the plate 26. By providing enlarged slots 56 the axis of the cutter may be angularly or axially adjusted to a limited extent.

The cutter spindle 58 is journaled in spaced anti-friction bearings 59 mounted in the circular part 60 of the housing. The spindle has a projection at one end for receiving a drive gear 61 which is secured to the spindle for rotating the same independently of the driving mechanism for the member 26. The other end of the spindle projects, as shown in Figure 5, and has a spindle nose 62 upon which is integrally formed a pair of driving keys 63. These keys fit into a slot 64 formed in the face of the cutter for imparting rotation thereto. The face of the cutter is also counterbored at 65 which counterbore is adapted to fit the outside diameter 66 of the spindle nose 62. The cutter is clamped to the end of the spindle nose by a draw bar 67 which is threaded in the end of a taper ended member 68 which fits a tapered hole 69 formed in the center of the cutter body. The draw bar 67 extends through the axis of the spindle to the other end where it is provided with a head 70 for the purpose of clamping the cutter to the spindle and in driving relation thereto.

The member 68 projects beyond the cutter and is provided with a journal portion 71 for receiving a work guide roller 72 that is mounted for rotation on the journal 71 by anti-friction bearings 73. The outer ring of the guide roller is secured to the central or hub portion of the roller by resilient material indicated by the reference numeral 74 to insure better contact between the roller and the work piece W regardless of slight irregularities therein. It will be noted from Figure 1 that there is a guide roller on each side of the work piece which tends to keep the work piece centered between the axis of the two cutter spindles.

Since the work piece does not rotate, the cutting action is obtained by rotating the face plate 25 and thereby the cutters bodily about the work piece, and simultaneously but independently rotating the cutters during their bodily movement. The result is a spiral cutting path winding around the work as it progresses through the device.

The width of the cutting path would be the length of the line of tangency longitudinally on the work between the circular surface of the work and the working face of the cutter. In the diagram in Figure 7, the reference numeral 75 indicates the line of tangency on the top surface of the work piece W and the circle 76 represents the circular working face of the upper cutter 52, and it will be noted that this circle intercepts a predetermined length of the line 75, this length being indicated by the reference numeral 77.

It will now be seen that the line 77 is a chord of the circle 76. Therefore, the width of the cutting path is equal to the chord 77. The length of this chord will, of course, vary in accordance with the amount that the cutter face overlaps the line of tangency and also upon the diameter of the cutter. The length of this chord also determines the maximum pitch of the spiral cutting path of one cutter. The actual pitch is determined by the distance that the work is fed during one revolution of the carrier plate 25.

The driving means for rotating the carrier plate is shown in Figures 2 and 3. As shown in Figure 2, a prime mover 78 is mounted on the top of the housing 37 and operatively connected by suitable belt means 79 to a drive pulley 80 which is attached to the end of a shaft 81 suitably journaled in the housing. The shaft 81 is parallel to a second shaft 82 journaled in the housing, and the ends of these shafts project beyond one end of the housing for receiving a pair of change gears 83 and 84, by means of which the shafts are coupled together and by means of which the rate of rotation of one may be changed with respect to the other. The shaft 82 is parallel to a third shaft 85 journaled in the housing, and it is operatively connected to the shaft 82 by a second pair of change gears 86 and 87. The shaft 85 has worm 88 keyed thereto in mesh with the worm wheel 30, which, as previously explained, is keyed to the journal of the carrier plate 25. Thus, the motor 78 serves to rotate the plate carrying the cutter spindles. The cutters, however, are driven by an independent drive mechanism shown in Figures 1 and 4 and includes a prime mover 89 mounted on the base of the machine. This motor is operatively connected by suitable drive means, such as belts 90 to a pulley 91 which, as shown in Figure 4, is secured to the end of a shaft 92 rotatably journaled in a boss 93 carried by the housing 37. The shaft 92 drives, through bevel gears 94 and shaft 95, a pinion 96 keyed to the projecting end of shaft 95. This pinion meshes with the teeth 97 of a gear 98 which also has integrally formed bevel gear teeth 99. The gear 98 is supported on the hub 100 of the carrier plate by anti-friction bearings 101. Thus, the gear 98 may be rotated independently of the rate of rotation of the hub 100. The bevel gear teeth 99 simultaneously intermesh with bevel gears 100a and 101a located on opposite sides of the work. The gear 100a is supported on the end of a shaft 102 which is journaled in a boss 103 formed integral with the carrier plate 26, and the lower end of the shaft has a gear 104 secured thereto in intermeshing relation with the gear 61 of the cutter spindle for the cutter 53. The bevel gear 101a is similarly mounted and connected for driving the spindle of the cutter 52.

The cutting action is accomplished in the following manner.

As shown in Figure 7, the cutter 52 rotates in a clockwise direction as indicated by the arrow 105, and the cutter 53 rotates in a counterclockwise direction as indicated by the arrow 106. These cutters are carred by a common support 26 as previously set forth, and assuming for the moment that the support 26 is capable of free rotation, it will be evident that when the cutting blade 107 in Figure 7 contacts the work piece at the point 108 that a reactionary force would be imparted to the blade by the work piece due to its movement in the direction of the arrow 109 and the resultant of this force can be represented by the component 110 acting at the center of rotation of the cutter. Referring to Figure 8, it will be seen that the force component 110 is acting normally to the perpendicular 111 which passes through the center of rotation 112 of the support 26. Since the center 112 represents diagrammatically the only support for the cutter in opposition to the reaction of the work, it will be seen that the force 110 would cause bodily movement of the cutter in a counterclockwise direction as represented by the arrow 113 about the center 112. By the same reasoning the reaction of the work on the cutter blade 114 of cutter 53 would produce a component 115 which will be resolved in the counterclockwise component 116. It should now be evident that if the cutters could be held against rotation while the work piece W moved against them, that forces would automatically be set up to cause counterclockwise rotation of the carrier plate 26 if it was free to move. The important net result of this analysis is that the reaction of the cutting force on the cutter carrier would develop counterclockwise rotation of the carrier plate.

Advantage is taken of this situation to drive the carrier plate 26 in a counterclockwise direction as viewed in Figure 1 and thereby obtain the assistance of the reaction of the cutting force to assist in imparting the rotation to the carrier plate. As previously stated, and described in connection with Figure 2, the carrier plate is driven by the worm 88 intermeshing with the worm gear 30 with the result that the reactionary force from the cutters will take up the backlash between the worm wheel and the worm in the driving direction so that the actual effect is that as the worm 88 rotates, it acts as a governor and permits the worm wheel 30 to turn in one direction rather than actually driving it in the other direction. Since the cutting reaction is taken up by the axial thrust on the worm, there is no tendency to drive back through the transmission to the motor, and thus urge the motor to run backwards. This makes it possible to use a much smaller horsepower motor and transmission for rotating the cutter support.

By bodily rotating the cutters about the work as it feeds, it should be evident that each cutter will produce a helical cutting path equal in width to the chord 77, shown in Figure 7. These cutting paths will wind about the work in the nature of a double thread.

Maximum results can thus be obtained if the distance that the work is moved during one revolution of the cutters about the work is equal to four times the length of the chord 77.

In the operation of the device, the cutters are continuously rotated on their respective axes and simultaneously moved in a planetary motion. The bar stock is continuously fed in the machine and moved continuously therethrough by suitable power driven friction means while being held against rotation. Thus, one bar after another may be machined in continuous succession.

What is claimed is:

1. In a device for machining long bar stock, the combination of a fixed support, a rotatable member journaled therein and having an axial bore through which the stock is fed, a pair of cutter spindles supported on said member adjacent one end of said bore with the axes of said spindles lying parallel to but upon opposite sides of a diametral plane passing through said bore, face milling cutters attached to the ends of said spindles for engagement along chordal lines of the cutter faces with diametrically opposite sides of the stock whereby the cutting reaction would potentially cause rotation of said member in a predetermined direction, means including a ring gear rotatably mounted on said rotatable member concentric with said bore for rotating said cutter spindles independently of said rotatable member, and a power operable worm and worm gear governor mechanism for controlling the rate of rotation of said member in said predetermined direction.

2. In a device for machining round bar stock, the combination of a fixed support, a rotatable member having a journal portion rotatably mounted on said fixed support, said journal portion having an axial bore through which the round stock is fed, said member having a face plate normal to said bore, means journaling a pair of cutter spindles on said face plate with their axes parallel to said plate and located on opposite sides of said bore, face milling cutters attached to the end of said spindles, said spindles being laterally spaced to effect tangential engagement of the faces of said cutters with opposite sides of said stock and along chordal lines of the face of said cutters, means to rotate said cutters in a direction to cause the teeth to move along the chordal lines opposite to the direction of feed of the stock, the cutting reaction of said cutters on the face plate tending to cause rotation of said member in a predetermined direction, first power operable means including a worm and worm gear governor mechanism for controlling the rate of rotation of said member in said predetermined direction, and second power operable means independent of said first power operable means and operatively connected for driving said spindles in the direction to produce rotation of said member in said predetermined direction.

References Cited in the file of this patent

UNITED STATES PATENTS

| | | |
|---|---|---|
| 1,809,880 | Wise | June 16, 1931 |
| 2,109,415 | Deiters | Feb. 22, 1938 |
| 2,215,007 | Kraus | Sept. 17, 1940 |
| 2,326,391 | Premo | Aug. 10, 1943 |

FOREIGN PATENTS

| | | |
|---|---|---|
| 81,806 | Switzerland | Feb. 21, 1919 |